US010728025B2

(12) United States Patent
Kumar et al.

(10) Patent No.: US 10,728,025 B2
(45) Date of Patent: Jul. 28, 2020

(54) ENCRYPTION BY DEFAULT IN AN ELASTIC COMPUTING SYSTEM

(71) Applicant: Amazon Technologies, Inc., Seattle, WA (US)

(72) Inventors: Sandeep Kumar, Sammamish, WA (US); Danny Wei, Seattle, WA (US); Lalit Jain, Seattle, WA (US); Varun Verma, Newcastle, WA (US); Oscar Allen Grim Courchaine, Seattle, WA (US); Kristina Kraemer Brenneman, Renton, WA (US); Sriram Venugopal, Issaquah, WA (US); Arvind Chandrasekar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 15/952,743

(22) Filed: Apr. 13, 2018

(65) Prior Publication Data

US 2019/0319785 A1  Oct. 17, 2019

(51) Int. Cl.
  *H04L 9/08* (2006.01)
  *H04L 9/06* (2006.01)
  *H04L 9/14* (2006.01)
(52) U.S. Cl.
  CPC .......... *H04L 9/0819* (2013.01); *H04L 9/0618* (2013.01); *H04L 9/14* (2013.01)

(58) Field of Classification Search
  CPC .................................................... H04L 9/0819
  See application file for complete search history.

(56) References Cited

U.S. PATENT DOCUMENTS

| 8,166,314 | B1 * | 4/2012 | Raizen | G06F 21/78 711/164 |
| 8,261,068 | B1 * | 9/2012 | Raizen | G06F 21/6218 713/164 |
| 2014/0068279 | A1 * | 3/2014 | Kurspahic | H04L 9/0894 713/193 |
| 2017/0142076 | A1 * | 5/2017 | Ford | G06F 21/10 |

* cited by examiner

*Primary Examiner* — Simon P Kanaan
(74) *Attorney, Agent, or Firm* — Knobbe, Martens, Olson & Bear, LLP

(57) ABSTRACT

Generally described, one or more aspects of the present application correspond to techniques for creating encrypted block store volumes of data from unencrypted object storage snapshots of the volumes. These encryption techniques use a special pool of servers for performing the encryption. These encryption servers are not accessible to users, and they perform encryption and pass encrypted volumes to other block store servers for user access. The encryption context for the volumes can be persisted on the encryption severs for as long as needed for encryption and not shared with the user-facing servers in order to prevent user access to encryption context.

19 Claims, 6 Drawing Sheets

ENCRYPTION BY DEFAULT IN AN ELASTIC COMPUTING SYSTEM

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1A:
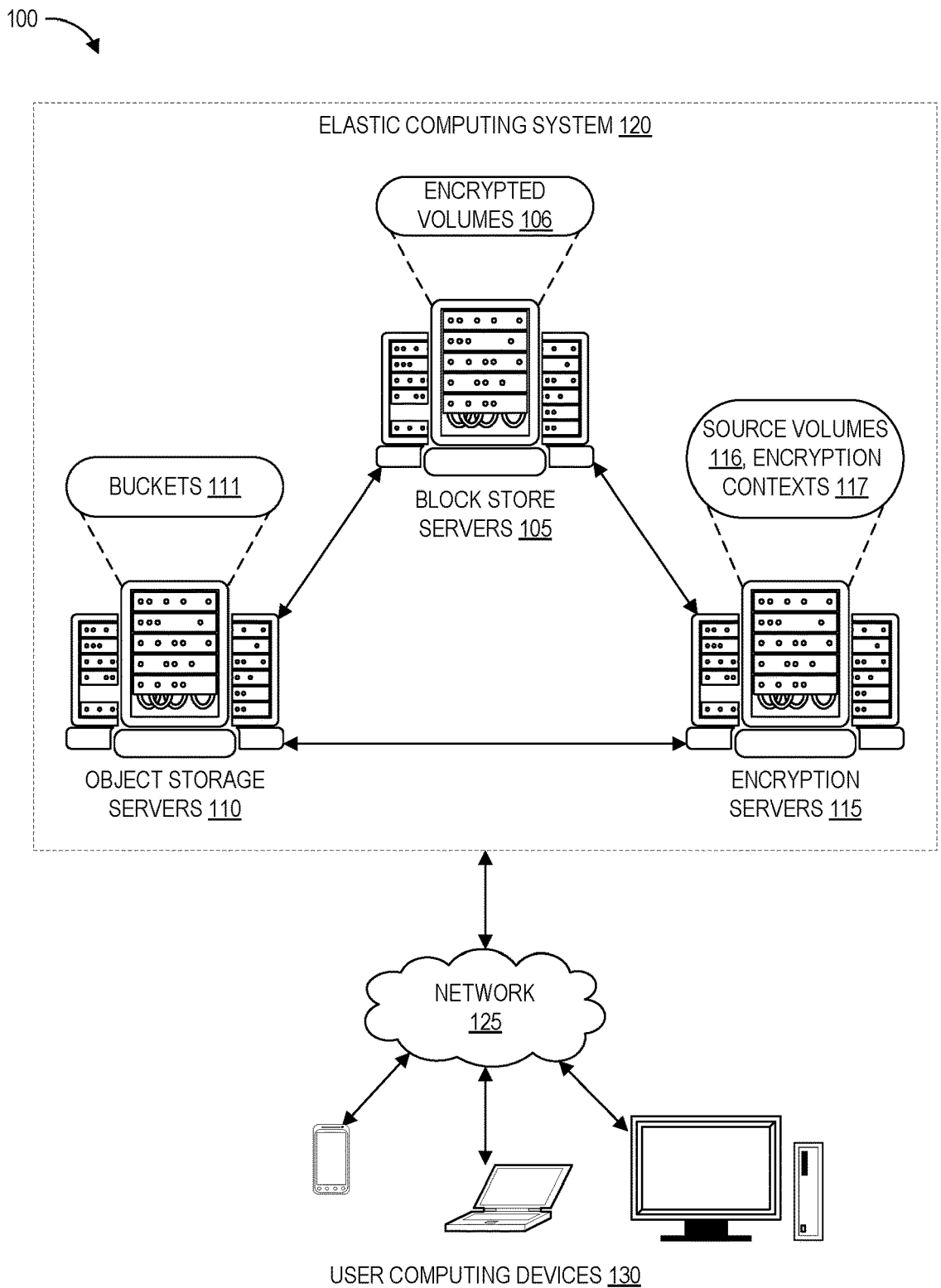
FIG. 1A depicts a schematic diagram of an elastic computing system in which various embodiments according to the present disclosure can be implemented.

Generally described, the present disclosure relates to the creation and management of encrypted data replica instances, for example of volumes of data stored using block storage within a networked elastic computing system. However, users may not initially request encryption of their volumes, which can result in any backup copies (some of which are referred to herein as "snapshots") also not being encrypted. These backup copies can be used to create new copies of the volume, which similarly would not be encrypted. However, changing data protection regulations may require some or all data within the elastic computing system to be encrypted. The aforementioned automatic unencrypted data replication would result in new volumes that do not comply with the regulations. Existing techniques for creating new copies of volumes from unencrypted snapshots of volume data may result in the sharing of encryption information with hardware that hosts the encrypted information, which may compromise data security.

The aforementioned problems, among others, are addressed in some embodiments by the disclosed techniques for supporting default encryption for a new replica of a volume, even when the data from which the new replica is created (e.g., a snapshot) is not itself encrypted. The disclosed technology beneficially provides a mechanism for encrypting a volume while minimizing exposure of the encryption information. For example, the disclosed techniques can involve a custom volume modification technique that achieves encryption on the fly, that is, in real time in response to user requests to create new volumes from snapshots. The volume modification technique may not be exposed to users, such that transitions in volume states (e.g., unencrypted to encrypted) are hidden. In some examples, this encryption-by-default can be an opt-in feature that users can select such that any future replicas of volumes belonging to that user will be encrypted after they opt in. Users may also specify a default key to be used for encryption, and may retain control over setting permissions, applying policies, rotating keys, and the like for their default key. When this encryption-by-default is enabled for a particular user, new volumes created from unencrypted snapshots will be encrypted with their key. In some implementations, new snapshot copies of unencrypted snapshots can also be encrypted with their key. Some implementations of encryption-by-default can use the AES-256 algorithm for encryption.

The disclosed techniques can pull snapshot data of a volume to a special-purpose hardware pool that stores the encryption context for the volume. This special-purpose hardware pool can create the encrypted version of the volume and then pass the encrypted volume from this pool to a different set of computer hardware for access and use by the user. Encryption context can refer to a set of key-value pairs used for encryption and decryption operations within the elastic computing system, and can also include a grant token on the encryption key and/or an encryption status flag, which in the disclosed techniques would be set to "encrypt" or potentially "transcode." Generally, encryption context refers to any value (e.g., a string of alphanumeric characters) that can be used to encrypt data. Although the encryption context is not included in the encoded volume, it is cryptographically bound to the encoded volume during encryption and must be passed again when a user or the system calls for decryption or re-encryption. Decryption only succeeds if the encryption context passed for decryption is exactly the same as the encryption context used during encryption. The hardware pool used to create encrypted volumes and any volume data stored thereon can be hidden from the user, meaning for example that users cannot perform reads and writes to data stored in this hardware pool, and/or that users are not charged for storage space occupied by their volumes in this hardware pool. Beneficially, the use of this dedicated pool of hardware avoids storing the key and the encrypted data on the same computer hardware.

As would be appreciated by one of skill in the art, the use of a dedicated hardware pool to enable encryption-by-default, as disclosed herein, represents a significant technological advance over prior implementations. Specifically, the use of the dedicated hardware pool for encryption-by-default results in compliance with data protection regulations without pushing any additional burden to users to encrypt their own data. Further, the use of a dedicated hardware pool for performing encryption both isolates the encryption context from the hardware used to store the encrypted volume, and also mitigates any impact on user reads and writes to the primary copy of the volume, as the primary copy is not involved in any data transfer for the encryption process. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting. For example, although the encryption-by-default techniques are described with respect to encryption, they can also be used for transcoding where the type of encryption changes between the source data and the encrypted data. Further, although the encryption-by-default techniques are described with respect to creating encrypted volumes from unencrypted snapshots, the described techniques can similarly create encrypted volumes from unencrypted volumes as the source of data, or can create encrypted snapshots from unencrypted snapshots or unencrypted volumes. In addition, although described in the context of an elastic computing system, the disclosed encryption-by-default techniques can be implemented in other suitable data-hosting networked computing environments.

Overview of Example Computing Environment with Tertiary Replica

FIG. 1A depicts an example computing environment 100 including an elastic computing system 120 in which the disclosed encryption-by-default can be implemented. The elastic computing system 120 can be accessed by user devices 130 over a network 125. The elastic computing system 120 includes one or more compute servers 115, one or more object storage servers 110, and one or more block store servers 105 that are in networked communication with one another and with the network 125 to provide users with on-demand access to computing resources including volumes 111 and buckets 106, among others. These particular resources are described in further detail below. Some implementations of elastic computing system 120 can additionally include elastic compute servers providing computing resources (referred to as "instances"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable "virtual computing devices" via their use of the object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the encryption servers 115, object storage servers 110, and block store servers 105. The data centers within an availability zone and the availability zones within a region are connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein.

User computing devices 130 can include any network-equipped computing device, for example desktop computers, laptops, smartphones, tablets, e-readers, gaming consoles, and the like. Users can access the elastic computing system 120 via their computing devices 130, over the network 125, to view or manage their data and computing resources, as well as to use websites and/or applications hosted by the elastic computing system 120.

Turning specifically to the roles of the different servers within the elastic computing system 120, the block store servers 105 provide persistent data storage in the form of volumes 106. In FIG. 1A, these are shown as encrypted volumes 106 that can be encrypted from unencrypted snapshots as described herein. Some of the volumes stored on the block store servers 105 may be encrypted through other techniques, or may be unencrypted. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context.

User volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes 106 may be partitioned a number of times (e.g., up to 16) with each partition hosted by a device of the elastic computing system 120. The block store servers 105 are configured to mirror the content of block devices between servers 105 and synchronously replicate data across redundant servers. For example, the block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The primary and secondary replicas can support user reads and writes (input/output operations, or "I/O operations"), and thus the block store servers 105 can be accessible to the user computing devices 130 over the network 125.

The object storage servers 110 represent another type of storage within the elastic computing environment 120. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the volumes described above, they can also be used to provide data backup as described below with respect to snapshots (e.g., object-stored backups of volume data).

Users can instruct the elastic computing system 120 to create snapshots of their volumes stored on the block store servers 105. When a volume is unencrypted, typically any snapshot of that volume would be unencrypted as well. A snapshot can then be used to create a new volume with information matching the volume captured in the snapshot, for example providing the benefit of feeding the volume data to the new copy without impacting I/O operations at the primary and secondary replicas of the volume. Further, due to the greater redundancy of the object storage servers 110 provided in some embodiments, such snapshots may provide a more resilient backup copy of a volume than additional copies stored on the block store servers 105. Another benefit of using a snapshot to create a new volume copy is that it may provide the ability to replicate the volume across availability zones, while the block store servers 105 may only support replication within a given availability zone.

In one embodiment, a snapshot is a point-in-time block-level backup of the volume, stored as a copy of data on the volume on one or more of the object storage servers 110 (e.g., as a single object or a collection of objects). However, unlike other data stored on the object storage servers 110, snapshots may not be accessible within user buckets, and instead are accessible through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the blocks of the volume to which each of the one or more objects correspond. Due to the use of incremental snapshots, when the subsequent snapshots are taken of the same volume, only the blocks that have changed since the first snapshot need by copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 110, and new copies of the instance can be launched from the machine image.

The encryption servers 115 can be positioned within the elastic computing system 120 as an intermediary between the object storage servers 110 and the block store servers 105 for the disclosed encryption-by-default techniques. The encryption servers 115, like the block store servers 105, also operate to store volumes of data, shown in FIG. 1A as source volumes 116. These source volumes 116 can also be stored using block storage, and may be built using snapshots from the object storage servers 110. In addition, the encryption servers 115 store encryption contexts 117 for encrypting these source volumes 116. In some implementations, the encryption servers 115 can be in data communication with the object storage servers 110 and the block store servers 105, but may not be accessible to the user computing devices 130.

Figure 1B:
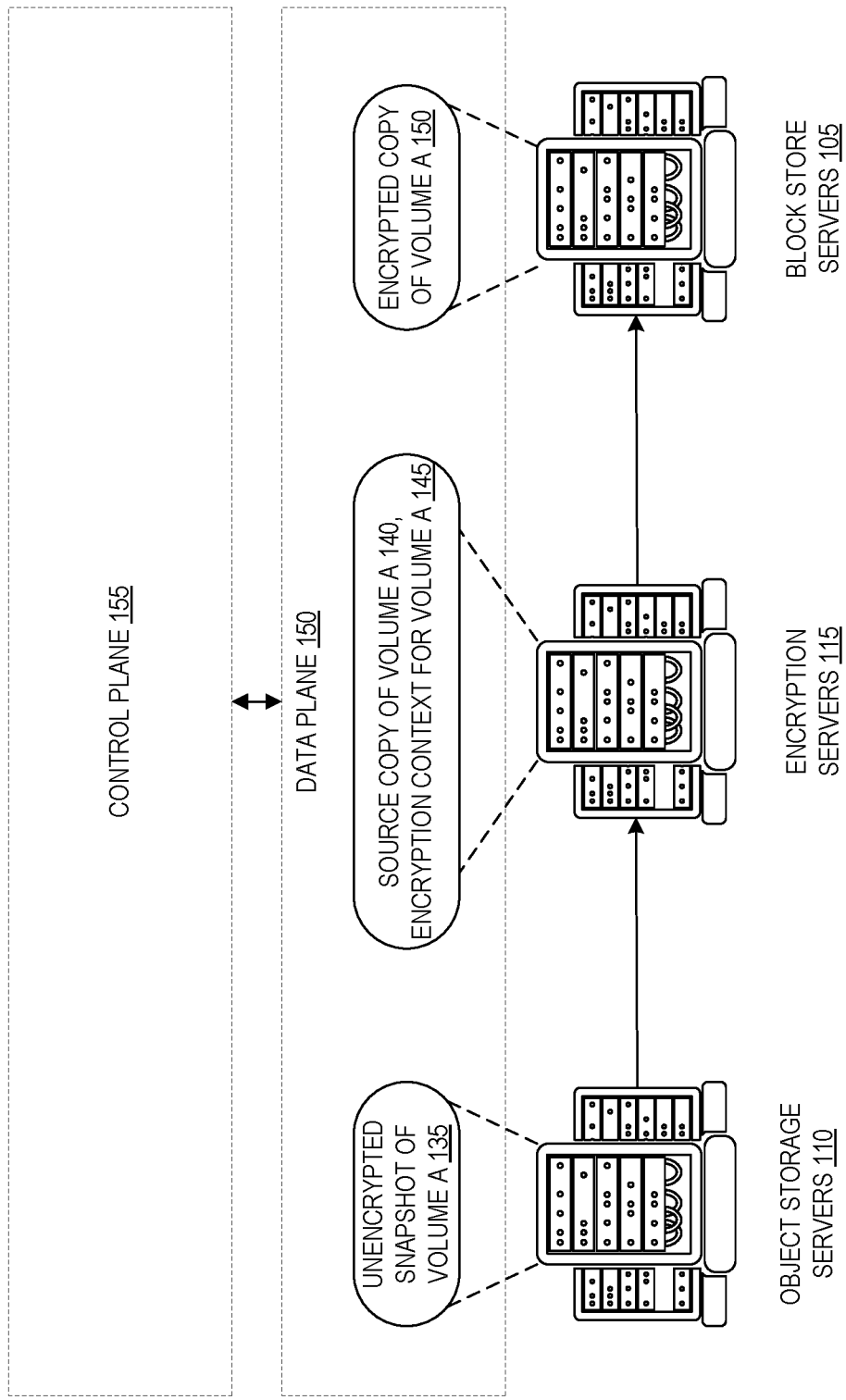
FIG. 1B depicts a schematic diagram of replicated data instances for creating encrypted volumes from unencrypted snapshots within the elastic computing system of FIG. 1A, according to the present disclosure.

FIG. 1B depicts an example of how the object storage servers 110, encryption servers 115, and block store servers 105 can be configured to data for encryption-by-default, according to embodiments of the present disclosure. FIG. 1B also depicts a data plane 150 and a control plane 155 of the elastic computing system 120. The data plane 150 represents the movement of user data through the elastic computing system 120, while the control plane 155 represents the movement of control signals through the elastic computing system 120. One skilled in the art will appreciate that the data plane 150 and control plane 155 represent logical constructs related to the operation of servers 105, rather than a physical configuration of the servers 105, 110, 115.

The control plane 155 is a logical construct that can be implemented by at least one server with computer-executable software for coordinating system and user requests and propagating them to the appropriate servers in the elastic computing system 120. Functions of the control plane 155 can include, for example, replication of data, failover operations, and receiving requests from users for specific actions to be performed with respect to the data plane 150. These can include creating, cloning, and snapshotting volumes 106. The data plane 150 in the illustrated embodiment is implemented by execution of operations on the unencrypted snapshot 135, source volume 140, encryption context 145, and encrypted volume 145.

As described above, the object storage servers 110 can store an unencrypted snapshot of a particular volume. This is represented in FIG. 1B as the unencrypted snapshot 135 of volume A. When the user requests to create a new volume copying the state of volume A as reflected in the snapshot, the control plane 155 can coordinate providing the data of volume A from the unencrypted snapshot 135 of the object storage servers 110 to the encryption servers 115. The encryption servers 115 can create a new volume (referred to as "source volume" 140 as it is the source of the eventual encrypted volume) and write the data from the snapshot of volume A to that new volume. The encryption servers 115 can also store the encryption context 145 for volume A. As described above, the encryption context can be a key-value pair usable for encrypting the data and again for decrypting the encrypted data. After encryption on the encryption servers 115, the encrypted data of volume A is sent to the block store servers 105 as the encrypted copy 150 of volume A. This encrypted copy 150 is also referred to herein as the "target volume" as it is the target of the replication process. After completion of the target volume creation, the source volume may be deleted, or it may be redirected to a new target volume. The provisioning of the source volume and target volume can controlled by the control plane 155, as described in more detail below with respect to the encryption workflows.

Overview of Example Encryption-by-Default

Figure 2A:
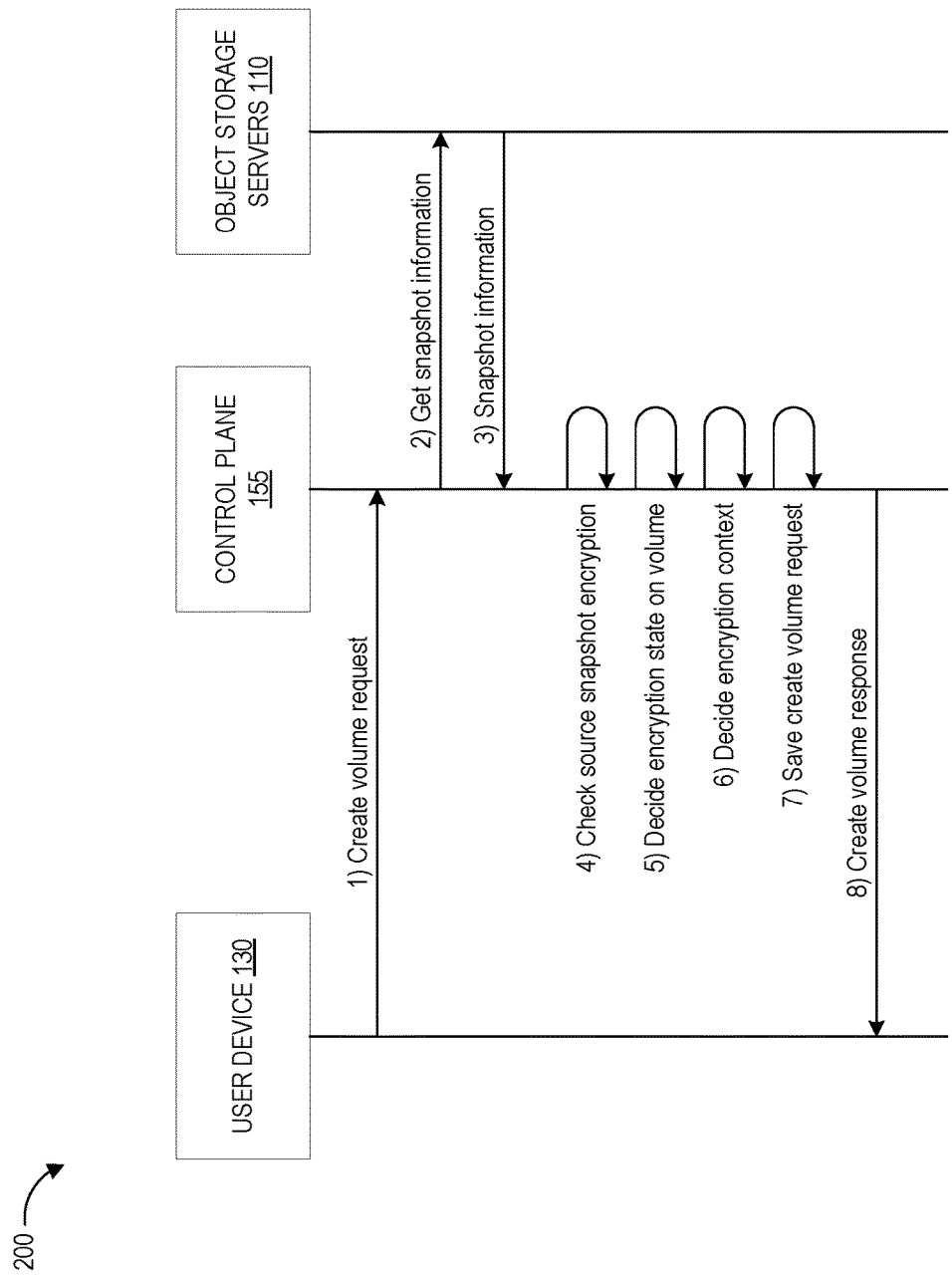
FIG. 2A depicts a schematic diagram of a first workflow for creating an encrypted volume within the elastic computing system of FIG. 1A.

FIG. 2A depicts a schematic diagram of a first workflow for creating an encrypted volume within the elastic computing system 120. FIG. 2A depicts data communications between the user device 130, control plane 155, and object storage servers 110 for a portion of the process used for encryption-by-default of new volumes. The user device 130 may access the elastic computing system 120 through an API.

With continued reference to FIG. 2A, illustrative interactions 200 are depicted for initiating encryption-by-default of a volume from an unencrypted snapshot using a dedicated hardware pool to store decrypted encryption keys. The interactions of FIG. 2A begin at (1), where the user device 130 submits a create volume request to the control plane 155. In response to the request, at (2) the control plane 155 queries the object storage servers 110 to get snapshot information, and at (3) the object storage servers 110 provide the snapshot information to the control plane 155. The snapshot information can include a snapshot ID, locations of different portions of the snapshot corresponding to different blocks of the volume, whether the snapshot is unencrypted, and, in implementations in which encryption-by-default is an opt-in feature, whether encryption-by-default is enabled. In some implementations, (2) and (3) can also involve the object storage 110 transmitting the volume data of the snapshot to the control plane 155.

At (4) the control plane checks whether the source snapshot is encrypted using the snapshot information, and at (5) the control plane 155 determines the encryption state on the volume (e.g., whether encryption-by-default is enabled). If the snapshot is unencrypted and encryption-by-default is enabled, the control plane 155 will initiate the disclosed encryption-by-default process to fulfill the create volume request. If the snapshot is encrypted or encryption-by-default is not enabled, the control plane 155 can initiate a different process to fulfill the create volume request. Because these different processes are typical for the elastic computing system 120, the present disclosure focuses on the encryption-by-default process.

At (6), the control plane 155 can decide the encryption context. This can include checking whether encryption-by-default is enabled for this particular volume, and if so deciding the master key. In encryption, a master key is used to derive other keys. The encryption key used to encrypt the volume will be generated based on the master key. For example, if a user account has specified a master key (referred to as a "customer master key" or CMK), the control plane 155 can use the CMK as the master key, otherwise the control plane 155 can assign a master key. A CMK refers to a logical key that represents the top of a customer's key hierarchy, as it can be used to generate, encrypt, and decrypt data keys usable to encrypt data (referred to herein as "encryption keys"). The disclosed master keys and encryption keys may be symmetric. Symmetric key techniques use the same cryptographic keys for both encryption of plaintext and decryption of ciphertext. The keys may be identical or there may be a simple transformation to go between the two keys.

At (7) the control plane 155 saves the create volume request, including the volume data, the encryption context, and an indication to initiate the encryption-by-default process. Thereafter, the control plane 155 at (8) initiates the create volume response, described in more detail with respect to FIGS. 3A and 3B.

Figure 2B:
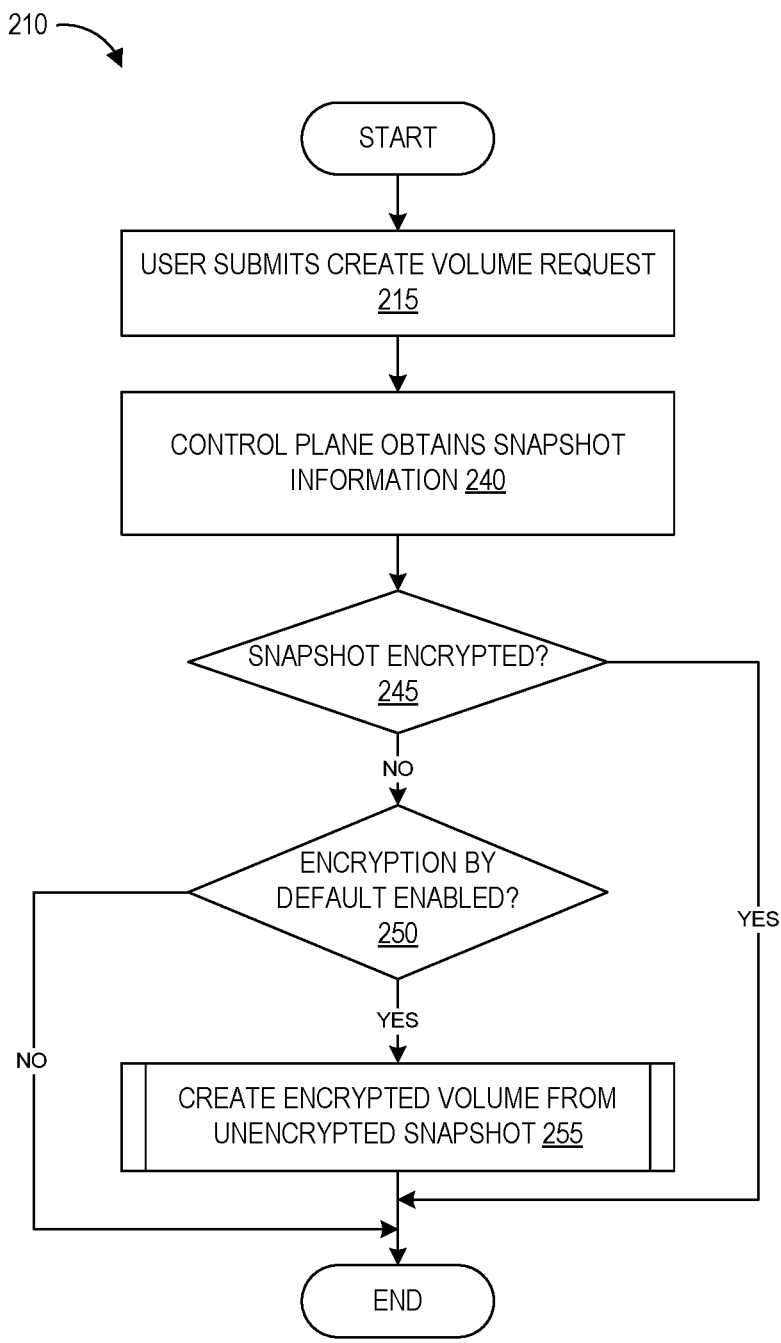
FIG. 2B is a flowchart of an example process for creating the encrypted volume of FIG. 2A.

FIG. 2B is a flowchart of an example process 210 for creating the encrypted volume of FIG. 2A. The process 230 can be performed under control of the control plane 155 of the elastic computing system 120 in some embodiments.

At block 215, the user submits the create volume request described above with respect to (1). A user may create a new volume, for example, when the volume includes data and they want to run a number of different tests on the data simultaneously. As another example, a user may create a new volume when they need to run a new computing instance within the elastic computing system 120, where each computing instance has attached thereto one volume providing persistent storage for the computing instance.

At block 240, the control plane 155 obtains snapshot information, either from the object storage servers 110 or a service that hosts metadata of snapshots on the object storage servers. As described above, this snapshot information includes data that enables the control plane 155 to ascertain the encryption status of the snapshot and the encryption state on the volume, such that the control plane 155 can initiate the appropriate one of a number of create volume subroutines.

At decision block 245, the control plane 155 determines whether the snapshot is encrypted. If the snapshot is encrypted, the process 210 terminates and the control plane 155 initiates a subroutine for creating an encrypted volume from the encrypted snapshot. For example, a snapshot of an encrypted volume is typically also encrypted. If the snapshot is not encrypted, the process 210 proceeds to block 250. For example, a snapshot of an unencrypted volume is typically also unencrypted.

At decision block 250, the control plane 155 determines whether the encryption-by-default is enabled for the volume. As described above, in some implementations encryption-by-default can be an opt-in feature that allows users to select encryption-by-default for future volume copies in their account settings. In some implementations, for example for certain types of data that require secure storage or heightened privacy, encryption-by-default can be set by the elastic computing system 120. If encryption-by-default is not enabled for the volume, the process 210 terminates and the control plane 155 initiates a subroutine for creating an unencrypted volume from the unencrypted snapshot. If encryption-by-default is enabled for the volume, the control plane 155 can decide the encryption context (e.g., which master key will be used to generate the encryption key), and the process 210 proceeds to block 255.

At block 255, the control plane 155 implements a subroutine for creating an encrypted volume from the unencrypted snapshot. As described above, this can entail using a special hardware pool (e.g., the encryption servers 115) to temporarily store the volume data together with the encryption context. The encryption servers 115 can encrypt the blocks of the volume data and send the encrypted blocks to specified ones of the block store servers 105. Further details of an embodiment of this subroutine are described with respect to FIGS. 3A and 3B.

Figure 3A:
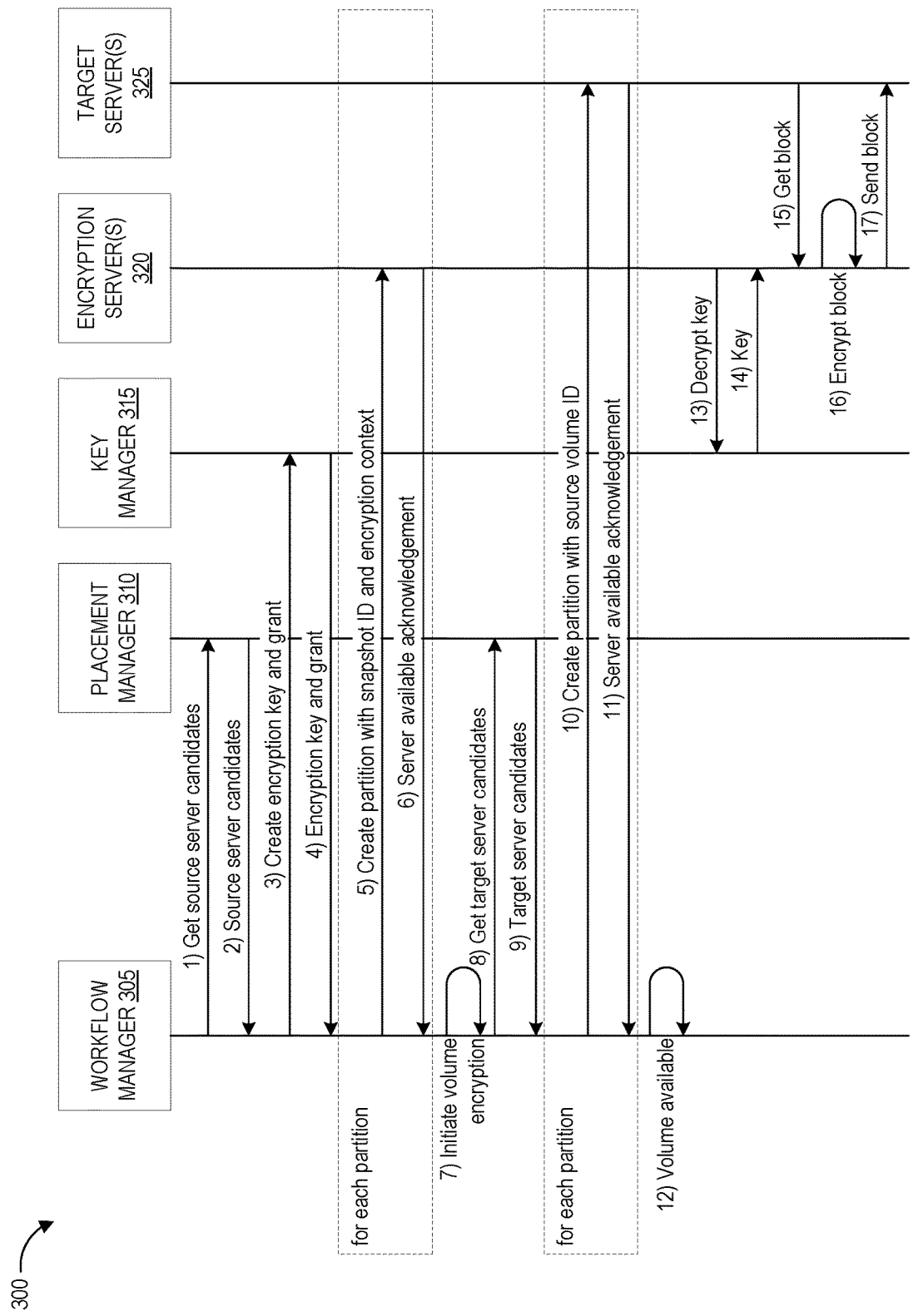
FIG. 3A depicts a schematic diagram of a second workflow for creating an encrypted volume within the elastic computing system of FIG. 1A.

FIG. 3A depicts a schematic diagram of a second workflow for creating an encrypted volume within the elastic computing system 120, where the encrypted volume is created from an unencrypted snapshot in a manner that limits security concerns and exposure of encryption information. Specifically, FIG. 3A depicts data communications between the workflow manager 305, placement manager 310, key manager 315, encryption server(s) 320, and target server(s) 325 for a portion of the process used for encryption-by-default of new volumes. The encryption server(s) 320 are one or more of the encryption servers 115, with the particular number of servers corresponding to the number of partitions of the volume in some implementations. The encryption server(s) 320 are used to store the volume data received from object storage as well as the encryption context. The target server(s) 325 are one or more of the block store servers 105, with the particular number of servers corresponding to the number of partitions of the volume in some implementations. The target server(s) 325 are used to store the encrypted copy of the volume received from the encryption server(s) 320.

The workflow manager 305 and placement manager 310 are logical constructs that handle new volume creation and can be implemented on internal servers of the elastic computing system 120 (e.g., servers that are not accessible to the user devices 130 but that are in data communication with the servers of the elastic computing system 120). The workflow manager 305 orchestrates the encryption-by-default create volume request, and can be considered as part of the control plane 155. The placement manager 310 picks the particular ones of the encryption servers 115 and block store servers 105 to use for hosting the source volume and encrypted volume, respectively.

The key manager 315 is also a logical construct that can be implemented on internal servers of the elastic computing system 120 in order to generate and manage cryptographic keys. For example, the key manager 315 can generate an encryption key based on master key or CMK, and then can allow authorized entities to obtain the encryption key. The key manager 315 manages assigning key-value pairs and grants for the encryption process. A key-value pair refers to a key identifier for an encrypted key, and serves as a validation mechanism for entities within the elastic computing system 120 trying to access the key. For example, a key-value pair of {"key name":"encryption by default key"} could be used to name the encryption key, and this name can be recorded when the key is used in order to track its usage. A grant is a token that enables a particular identity within the elastic computing system 120 to use a master key or CMK, or to gain access to the plaintext content of a key.

In some implementations, the key manager 315 may have a limit on concurrent grants on an encryption key (e.g., the number of grants for decrypting the key that can concurrently be provided). In the encryption-by-default systems described herein, two grants are created when creating a new volume—one for the target volume and one for the source volume. Although the source volume may be short-lived relative to the target volume, this can create a strain on the grant limits. Accordingly, in some implementations of the disclosed encryption-by-default systems the key manager 315 can double this limit for encryption-by-default encryptions.

With continued reference to FIG. 3A, illustrative interactions 300 are depicted for initiating encryption-by-default of a volume from an unencrypted snapshot. The interactions of FIG. 3A begin at (1), where the workflow manager 305 gets a list of encryption server candidates from the placement manager 310. As described herein, the encryption servers 320 are drawn from the dedicated hardware pool of the encryption servers 115, and the number of encryption servers 320 needed to host a source volume can depend upon the number of partitions of the source volume. Accordingly, at (2) the placement manager 310 returns a list of encryption server candidates to the workflow manager 305.

At (3) the workflow manager 305 sends a request to the key manager 315 to create an encryption key and grant for encrypting the source volume. Initially, the encryption key may be encrypted for heightened data security. A grant enables decryption of the encrypted key, and specifically enables the workflow manager 305 to programmatically delegate the use of encryption keys from the key manager 315 to other components of the elastic computing system 120, for example the encryption servers 320. Typically, a grant expires after one use. Accordingly, at (4) the key manager 315 returns an encrypted encryption key and grant to the workflow manager 305.

As illustrated by the dashed box labeled "for each partition," interactions (5) and (6) are performed for each partition of the volume, iteratively or in parallel. As described above, volumes may be partitioned a number of times, for example up to 16. At (5), the workflow manager 305 creates the partition on one of the encryption servers 320. This partition stores the encryption context (including the encrypted encryption key), as well as the data from a range of snapshot IDs corresponding to the partition. At (5), the encryption server 320 sends a server available acknowledgement back to the workflow manager 305 to indicate that it has successfully stored the encryption context and snapshot data.

After sending the encryption context and volume data to the encryption server(s) 320, the workflow manager 305 at (7) initiates volume encryption. The volume encryption involves the remaining interactions (8) through (19). At (8), the workflow manager 305 again queries the placement manager 310, this time for target server candidates. As described herein, the target servers 325 are drawn from the pool of the block store servers 105, and the number of target servers 325 will correspond to the number of encryption servers 320. Accordingly, at (9) the placement manager 310 returns a list of target server candidates to the workflow manager 305.

As illustrated by the dashed box labeled "for each partition," interactions (10) and (11) are performed for each partition of the volume, iteratively or in parallel. At (10), the workflow manager 305 creates the partition on one of the target servers 325. This partition stores the ID of the encryption server 320 hosting the corresponding partition, however the encryption context is not provided to the target servers 325. At (11), the target server 325 sends a server available acknowledgement back to the workflow manager 305 to indicate that it has successfully stored the ID of the corresponding encryption server 320.

As described above, the key manager 315 can restrict access to keys to authorized/authenticated identities within the elastic computing system 120. Accordingly, the encryption servers 320 can be assigned an authenticated identity. This identity can assume a role on behalf of user requests to create encrypted volumes and further decrypt the data encryption key encrypted with the user's CMK. When an encryption server 320 assumes a role, a temporary user (principal) can be created which is specific to the volume's context (i.e. the principal created during assuming role for volume1 will be different than the principal created while assuming role for volume2). This provides a validation such that the encryption server 320 acting on behalf of a volume doesn't accidently mix-up data from different volumes. The grant token created by the key manager 315 can be for this encryption server identity, such that no other account can use this grant to access the key.

During the partition creation at interactions (5) and (6), the workflow manager 305 can pass the encryption context (e.g., the encrypted key and other associated attributes) to the encryption servers 320. The encryption server 320 persists this information for later use, for example by storing the encryption context in persistent memory. In this manner, even if the encryption server 320 loses power (e.g., by rebooting), the encryption context remains accessible to the encryption server 320. The encryption server 320 can be set to disable I/O operations (e.g., it may not be configured to accept client connection requests), thus ensuring security of the encryption context.

When a target server 325 is asked to create the volume, it can be told to fetch data from the encryption server 320. Thereafter, when the target server 325 fetches the data from the encryption server 320, the encryption server 320 loads the encryption context and calls the key manager 315 to decrypt the encrypted encryption key (represented by interaction (13)). Based on the authorized identity of the encryption server 320, the key manager 315 decrypts the encrypted encryption key and sends the unencrypted (plaintext) key back to the encryption servers 320 at (14). The encryption server 320 stores the decrypted key into volatile memory for later use, for example a non-persistent metadata cache in some implementations. As such, the decrypted key will remain in memory while the encryption server 320 is powered on, but will be deleted when the encryption server is powered off (e.g., during a periodic re-boot). This volatile storage can avoid requiring the encryption server 320 calling the key manager 315 for the decrypted key again at each block encryption. Although the examples presented herein reference volatile storage of the decrypted key, other implantations can use alternative storage strategies to ensure security. For example, the decrypted key can be stored in a trusted platform module ("TPM"), volatile memory, non-volatile memory, an encrypted software container, etc.

At (15) the target servers 325 send get block requests to the encryption servers 320 (as designated by the encryption server ID stored on a given target server 325). In response to receiving the get block request, at (16) encryption server 320 encrypts the requested block using the decrypted key stored in the volatile memory, and at (17) the encryption server 320 sends the encrypted block to the requesting target server 325. The target servers 325 can store the encrypted blocks in persistent memory.

Both the source volume and the target volume can be replicated as described above, e.g., each may have a primary and a secondary replica. Once creation of the source volume is initiated, a mirror protocol can also be initiated to mirror the volume encryption context to its secondary replica. Upon completion of the creation of the target volume, the encryption servers 320 can delete the data of the source volume, the encryption context, and the decrypted key, freeing up this space for another source volume. As such, the target volume is encrypted but does not "know" that it is encrypted in the sense that it includes no information regarding its encryption key or encryption context. The encryption context may be accessed by the control plane 155 based on the volume ID if decryption is later requested. For example, when a client connects to the encrypted volume, the control plane 155 can create a grant for a virtualized computing role for a computing instance of the elastic computing system 120, and can provide the client with the encryption context. The client can decrypt the key and use this for encryption and decryption of reads and writes.

The control plane 155 can maintain the source snapshot information for a volume created from a snapshot. However, the encrypted target volume in some embodiments might not keep any reference to the source snapshot. As such, a snapshot request with respect to the encrypted target volume might not incrementally build off of the unencrypted snapshot, but instead would generate a new snapshot that would also be encrypted.

Figure 3B:
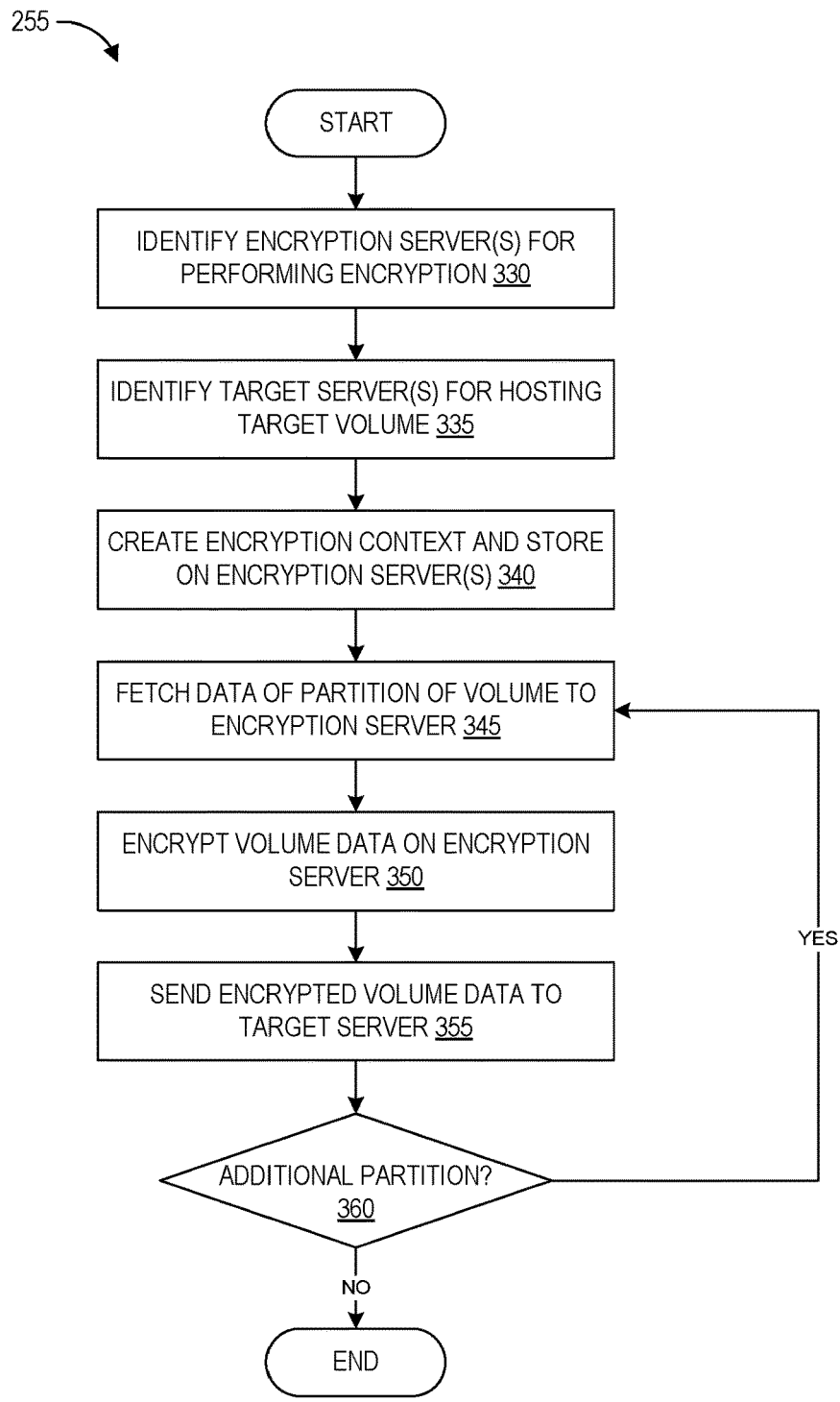
FIG. 3B is a flowchart of an example process for creating the encrypted volume of FIG. 3A.

FIG. 3B is a flowchart of an example process 255 for creating the encrypted volume using the interactions 300 of FIG. 3A. The process 255 is one implementation of the subroutine 255 of process 210.

At block 330, the workflow manager 305 identifies encryption servers 320 for performing the encryption, and at block 335 the workflow manager 305 identifies the target servers 325 for hosting the target volume. As described above, where the volume is partitioned a number of times, a corresponding number of source and target servers is selected for the volume encryption process. Each encryption server 320 encrypts the data of one partition and passes this data to a corresponding target server 325.

At block 340, the workflow manager 305 queries the key manager 315 to create or access the encryption context (e.g., the key-value pair of the encryption key that will be used for encryption, and a grant token that permits a one-time decryption of the key). The encryption context is stored on the encryption servers 320 for performing the encryption and for later access for decryption, but the encryption context is not provided to the target servers 325 in order to prevent the user device 130 (which has access to the target servers 325) from accessing the encryption context. As described above, this block can also include assigning an authorized identity to the encryption server 320 such that the encryption server 320 can access the key from the key manager 315.

At block 340, the workflow manager 305 can fetch the data of a particular partition of the volume to a encryption server 320. At block 350, the encryption server 320 can encrypt the volume data, for example by reading data locally and encrypting the data in memory such as a data buffer. At block 355, the encryption server 320 sends that data buffer out to the corresponding target server 325.

Decision block 360 determines whether any additional partitions are present in the volume. If so, the process 255 loops back through blocks 345 through 355 to encrypt data of the additional partition on an additional encryption server 320 and send the encrypted data to an additional target server 325. This loop can be repeated for as many partitions as are present in the volume. Beneficially, the encryption servers 320 pull chunks of data from the object storage servers 110 and proceed with this encryption process independently of any user I/O operations at the original copy of the volume, such that the encryption process does not result in any noticeable latency for the user.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 210, 255 may begin in response to an event, such as on a predetermined or dynamically determined schedule, on demand when initiated by a user or system administer, or in response to some other event. When the process 210, 255 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 210, 255 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. An elastic computing system, comprising:
a first set of servers having stored thereon an unencrypted object storage representation of data of a block storage volume;
a second set of servers configured to store an encrypted block representation of the block storage volume, wherein the second set of servers is configured with computer-executable instructions to handle user reads from and writes to blocks of the block storage volume via the encrypted block representation of the block storage volume; and
a third set of servers in data communication with the first set of servers and the second set of servers, the third set of servers configured with computer-executable instructions to:
receive the unencrypted object storage representation of blocks of the block storage volume from the first set of servers,
receive an encryption context identifying an encrypted key to use for encrypting the block storage volume,
store the encryption context in persistent memory on the third set of servers,
access a decrypted key representing decrypted contents of the encrypted key,
store the decrypted key in volatile memory on the third set of servers for use in encrypting the block storage volume,
encrypt the blocks of the block storage volume using the decrypted key to generate the encrypted block representation of the block storage volume, and
send the encrypted block representation of the block storage volume to the second set of servers;
wherein the third set of servers is inaccessible for the user reads from and writes to blocks of the block storage volume; and
wherein the encryption context and decrypted key are inaccessible to the second set of servers handling the user reads from and writes to blocks of the block storage volume.

2. The elastic computing system of claim 1, further comprising a key manager server, wherein the third set of servers is further configured with computer-executable instructions to:
request decryption of the encrypted key from the key manager server; and
receive the decrypted key from the key manager server, wherein the decrypted key corresponds to the decryption of the encrypted key by the key manager server.

3. The elastic computing system of claim 2, wherein the third set of servers is configured with an identity that is authorized by the key manager server to access the decrypted key.

4. The elastic computing system of claim 1, wherein the third set of servers is further configured with computer-executable instructions to:
store a block representation of the data of the volume based on the unencrypted object storage representation of the data of volume; and
for each block of the block representation of the data of the volume:
encrypt the block to generate an encrypted version of the block, and
send the encrypted version of the block to a server of the second set of servers.

5. The elastic computing system of claim 1, further comprising a network accessible to a user device requesting the user reads from or writes to the volume, wherein the second set of servers is accessible to the user device via the network, and wherein the third set of servers is not accessible to the user device.

6. The elastic computing system of claim 1, wherein the third set of servers is further configured with computer-executable instructions to:
delete the block representation of the data of the volume after sending of the encrypted block representation of the volume to the second set of servers; and
after deleting the block representation of the data of the volume, delete the encryption context from the persistent memory.

7. The elastic computing system of claim 1, wherein the second set of servers is further configured with computer-executable instructions to, in response to a request to decrypt the volume, identify the encryption context from a control plane of the elastic computing system.

8. A computer-implemented method, comprising:
receiving a request to create an encrypted block representation of a volume from an unencrypted object representation of the volume;
accessing a first set of servers having stored thereon the unencrypted object representation of the volume;
creating, on a second set of servers that are inaccessible to a user reading from or writing to blocks of the volume, an unencrypted block representation of the volume;
providing an encryption context to the second set of servers, the encryption context identifying an encrypted key to use for encrypting the volume;
assigning the second set of servers an identity authorized to access a decrypted key representing decrypted contents of the encrypted key;
providing the decrypted key to the second set of servers for use in encrypting the volume;
encrypting the unencrypted block representation of the volume on the second set of servers using the decrypted key to generate the encrypted block representation of the volume; and
sending the encrypted block representation of the volume to a third set of servers distinct from the second set of servers and configured to store the encrypted block representation of the volume, wherein the third set of servers is configured with computer-executable instructions to handle user reads from and writes to the volume via the encrypted block representation of the volume, wherein the encryption context is inaccessible to the third set of servers.

9. The computer-implemented method of claim 8, further comprising requesting, by the second set of servers, decryption of the encrypted key from a key manager server.

10. The computer-implemented method of claim 9, further comprising receiving, at the second set of servers, the decrypted key from the key manager server, wherein the decrypted key corresponds to the decryption of the encrypted encryption key by the key manager server.

11. The computer-implemented method of claim 10, further comprising storing the encryption context in a persistent memory of the second set of servers.

12. The computer-implemented method of claim 11, further comprising, after sending the encrypted block representation of the volume to a third set of servers, deleting the encryption context from the persistent memory.

13. The computer-implemented method of claim 8, further comprising, for each block of the unencrypted block representation of the data of the volume:
encrypting the block on a server of the second set of servers to generate an encrypted version of the block, and
sending the encrypted version of the block to a server of the third set of servers.

14. The computer-implemented method of claim 8, further comprising deleting the unencrypted block representation of the volume after sending the encrypted block representation of the volume to the third set of servers.

15. Non-transitory computer-readable media comprising computer-executable instructions that, when executed on a computing system, cause the computing system to perform operations comprising:
receiving a request to create an encrypted representation of a volume from an unencrypted representation of the volume;
accessing data of the unencrypted representation of the volume a first set of servers having stored thereon the unencrypted representation of the volume;
creating, on a second set of servers that are inaccessible to a user reading from or writing to the volume, an additional unencrypted representation of the volume using the data of the unencrypted representation of the volume;
providing a decrypted key for encrypting the volume to the second set of servers;
encrypting the additional unencrypted representation of the volume on the second set of servers using the decrypted key to generate the encrypted representation of the volume;
sending the encrypted representation of the volume to a third set of servers distinct from the second set of servers and configured to store the encrypted representation of the volume,
wherein the third set of servers is configured with computer-executable instructions to handle user reads from and writes to the volume via the encrypted block representation of the volume, and wherein the decrypted key is inaccessible to the third set of servers.

16. The non-transitory computer-readable media of claim 15, the operations further comprising:
providing the second set of servers with an encryption context identifying an encrypted key to use for encrypting the volume;
assigning the second set of servers an identity authorized to access a decrypted key representing decrypted contents of the encrypted key
requesting decryption of the encrypted encryption key from a key manager server.

17. The non-transitory computer-readable media of claim 16, the operations further comprising receiving, at the second set of servers, the decrypted key from the key manager server, wherein the decrypted key corresponds to the decryption of the encrypted encryption key by the key manager server.

18. The non-transitory computer-readable media of claim 17, the operations further comprising storing the encryption context in a persistent memory on the second set of servers.

19. The non-transitory computer-readable media of claim 18, the operations further comprising, in response to a request to decrypt the volume:
deleting the decrypted key from the second set of servers;
identifying the encryption context from the persistent memory; and requesting another decryption of the encrypted encryption key from the key manager server.

* * * * *